Dec. 28, 1965   L. PEASE   3,225,800
EDGING PICKER

Filed Dec. 31, 1962   10 Sheets-Sheet 1

INVENTOR.
Lionel Pease
BY
TW Secrest

Dec. 28, 1965 L. PEASE 3,225,800
EDGING PICKER
Filed Dec. 31, 1962 10 Sheets-Sheet 2

INVENTOR.
Lionel Pease
BY
T W Secrest
ATTORNEY

Dec. 28, 1965 L. PEASE 3,225,800
EDGING PICKER
Filed Dec. 31, 1962 10 Sheets-Sheet 4

INVENTOR.
Lionel Pease
BY
T W Secrest
ATTORNEY

Dec. 28, 1965 L. PEASE 3,225,800
EDGING PICKER
Filed Dec. 31, 1962 10 Sheets-Sheet 6

INVENTOR.
Lionel Pease
BY
T W Secrest
ATTORNEY

Dec. 28, 1965  L. PEASE  3,225,800
EDGING PICKER
Filed Dec. 31, 1962  10 Sheets-Sheet 7

INVENTOR.
Lionel Pease
BY
TW Secrest

Dec. 28, 1965   L. PEASE   3,225,800
EDGING PICKER
Filed Dec. 31, 1962   10 Sheets-Sheet 8

INVENTOR.
Lionel Pease
BY TW Secrest

Dec. 28, 1965    L. PEASE    3,225,800
EDGING PICKER
Filed Dec. 31, 1962    10 Sheets-Sheet 9

INVENTOR.
Lionel Pease
BY TW Secrest

United States Patent Office 3,225,800
Patented Dec. 28, 1965

3,225,800
EDGING PICKER
Lionel Pease, Seattle, Wash., assignor to Mill Equipment, Inc., Seattle, Wash.
Filed Dec. 31, 1962, Ser. No. 248,327
9 Claims. (Cl. 143—37)

This invention relates to edgers as employed in the lumber industry.

In the manufacture of lumber, one of the steps involves the sawing of the slabs of wood into smaller units. A conventional means for sawing these slabs is an edger. An edger comprises a number of spaced-apart saws; means to vary the spacing between the saws; means to feed the slabs to the saws; and, means to remove the smaller units from the edger. In the previously used edgers, the saws were manually moved with respect to each other. An operator, by means of levers, moved the saws to most beneficially cut the slabs of lumber. The operator faced the mouth of the edger and, as the slab moved onto the feed table, he determined the position of the saws and moved the same to these positions in the edger. The slab was cut, and, as is readily appreciated, slivers and refuse were formed. Due to the rotation of the saws, a long sliver may have accidentally flown back and injured or maimed the operator.

With this information and experience of edgers, I have invented an edger which has power shifting devices for moving the saws as desired; which edger has a quicker response for moving the saws than previously employed manually operated edgers; less manual input than previously available edgers; greater output than the conventional edger; more accurate in that the saws can be positioned to a pre-set and pre-determined position; more versatile than previously available edgers; greater recovery of material from a slab of wood in that the use of a shadow line makes it possible to more exactly cut a slag of wood; an automatic set for cuts and cross-feeds as there is no need for a man to pick up scrap or peelings as these are removed on cross belts; a straight-through production line which has not been realized with previously employed edgers as the slab of wood approached the edger at approximately right angles to the flow through the edger; and greater safety than other edgers as the operator does not stand in front of the machine and therefore is not in a position to be hit by pieces of wood kicked out of the edger.

These and other important advantages and objects of the invention will be more particularly brought forth upon reference to the drawings, the detailed specification of the invention and the claims.

Referring to the drawings it is seen that the invention comprises an edger 22, feed means 24 for the edger and saw positioning means 26. The edger 22 comprises a housing, schematically speaking, having sides 28 and end members, and is supported on legs 32 and 34. Positioned in the housing are feed rolls 36 and output rolls 38. Also in the housing is shaft 40. Mounted on this shaft 40 is a stationary saw 42, a first movable saw 44 and a second movable saw 46. The shaft 40 is driven by a motor 48 and which motor is illustrated in block diagram form.

Figures 7, 8:
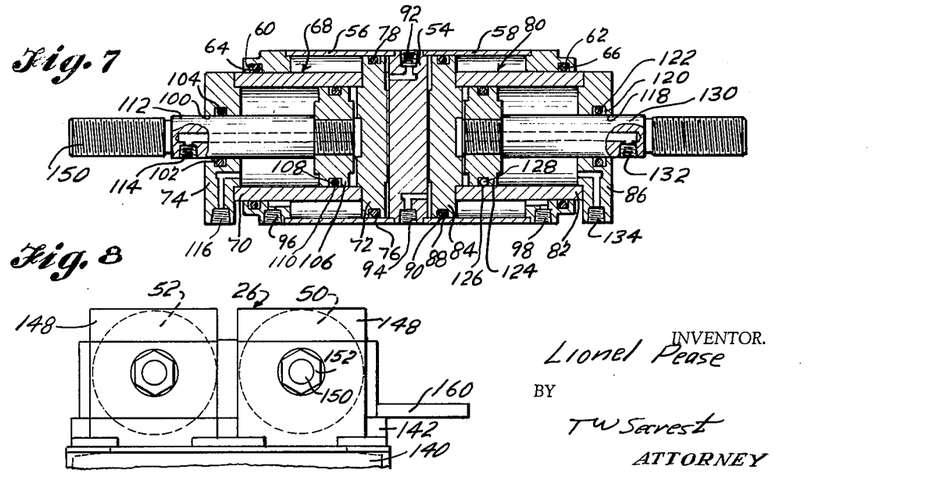
FIGURE 7 is a longitudinal cross-sectional view of a fluid-actuated cylinder and illustrates the movable plungers, and the movable inner cylinders so as to realize four settings in addition to the original setting.
FIGURE 8 is an end elevational view of the two fluid-actuated cylinders connected in series.

The positioning mechanism 26 for moving the saws 44 and 46 and also for moving the discharge belts in the discharge means 25 comprises two hydraulic or pneumatic cylinders 50 and 52. The two cylinders 50 and 52 are identical and, therefore, the same reference numerals will be employed for these two cylinders. Referring to FIGURE 7 it is seen that the cylinder comprises a center cylinder head 54 and a left cylinder barrel 56 and a right cylinder barrel 58 attached to the head 54. In the outer end of the cylinder barrel 56 there is an inner circular groove 60 and in the outer end of the barrel 58 there is an inner circular groove 62. Positioned in the groove 60 is an O-ring 64, and positioned in the groove 62 is an O-ring 66. Positioned in the inner cylinder 56 is a primary piston 68 having a barrel 70, an inner head 72 and an outer head 74. In the inner head 72 is a circular groove 76. In the circular groove 76 there is an O-ring 78. In the cylinder 58 there is a primary piston 80 having a cylinder wall 82, an inner head 84 and an outer 86. In the inner head 84 there is a circular groove 88. In the groove 88 there is an O-ring 90. In the center cylinder head 54 there is a tapped passageway 92 which leads between the left face of this cylinder head and the inner end 72. As is readily appreciated, the purpose of this is to allow a fluid to be forced between the center cylinder head 54 and the inner end 72 so as to move outwardly the primary piston 68. In the center cylinder head 54 there is a central tapped passageway 94 which leads between the right face of the head 54 and the inner end 84. As is readily appreciated, the purpose of this is to allow fluid to be forced between the head 54 and the inner end 84 so as to move outwardly primary piston 80. Near the end of the barrel 56 there is a tapped pasageway 96. This allows fluid to be introduced between the outer face of the inner end 72 and the outer end of the barrel 56 so as to move the primary piston 68 inwardly or towards the cylinder head 54. In the outer end of the barrel 58 there is a tapped passageway 98. This tapped passageway allows fluid to be introduced between the outer end of the barrel 58 and the outer face of the inner head 84 so as to move inwardly the primary piston 80.

In the central part of the outer head 74 there is a passageway 100. Surrounding this passageway 100 is a circular groove 102, and in the circular groove 102 there is an O-ring 104. In the barrel 68 there is positioned a secondary piston 106 having in the outer face a circular groove 108 and in the circular groove 108 an O-ring 110. Connecting with the piston 106 is a plunger 112. In the plunger 112 there is a tapped passageway 114. It is seen that the opening to the tapped passageway 114 is outside of the barrel 68 and the end 74 but extends longitudinally in the plunger 112 and terminates at the inner end of the plunger 112 and the piston 106. As is readily appreciated, it is possible to force a fluid through passageway 114 so that the fluid is between the inner end of the piston 106 and the outer face of the inner end 72. In this manner the plunger 112 can be moved outwardly. It is also seen that in the end 74 there is a tapped passageway 116 which terminates in the inner face of the outer end 74. As is readily appreciated, it is possible to force fluid through the tapped passageway 116 so as to force the piston 106 inwardly and thereby the plunger 112 inwardly.

in this groove 120 there is an O-ring 122. In the cylinder the passageway 118 there is a circular groove 120, and in this groove 120 there is an O-ring 122. In the cylinder 82 there is a secondary piston 124. In the outer face of the piston 124 there is a circular groove 126, and in the groove 126 there is an O-ring 128. Positioned in the piston 124, and projecting through the opening 118, there is a plunger 130. It is seen that in the plunger 130 there is a central tapped passageway 132. The opening of this passageway 132 is outside of the end 86 and extends longitudinally through the plunger 130 and terminates at the inner end of the plunger and piston 124. It is readily appreciated that it is possible to force a fluid through the tapped passageway 132 so as to enter between the outer face of the inner end 84 and the end of the plunger 130 and thereby force the plunger 130 outwardly. It is seen that in the end 86 there is a tapped passageway 134 which terminates at the inner face of the end 86. It is readily appreciated that it is possible to force fluid through the tapped passageway 134 so as to force the piston 124 inwardly and thereby force the plunger 130 inwardly.

In this fluid-actuated cylinder it is possible for the primary pistons 68 and 80 to each have, for example, a four-inch stroke, and for the secondary pistons 106 and 124, for example, to have a six-inch stroke. With a combination of four-inch and six-inch strokes, it is possible to have many numerous travelling distances. In addition to these pistons having a stroke of four inches and one of six inches, it is possible for one primary piston to have a stroke of two inches, a second primary piston to have a stroke of four inches and then the other (primary) pistons to have strokes of six inches. It is to be realized that various combinations of strokes may be combined into a fluid-actuated cylinder.

Figure 5:
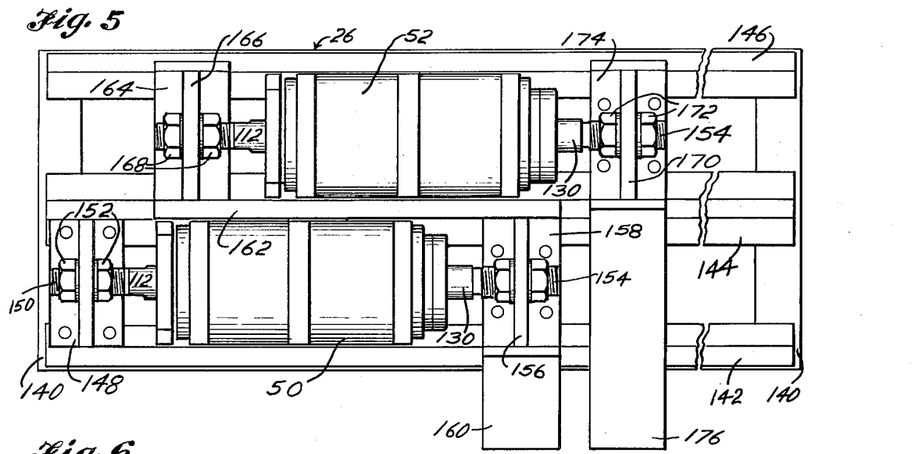
FIGURE 5 is a plan view of two fluid-actuated cylinders, said cylinders being connected in series.
Figure 6:
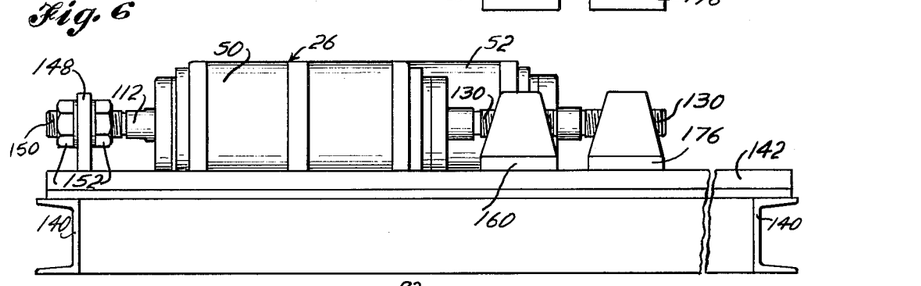
FIGURE 6 is a side elevational view of the two cylinders connected in series.

The cylinders 50 and 52 are mounted on a frame. The frame comprises two lateral members such as U-channels 140. Mounted on the U-channel members 140 are guides. More particularly, there is an outer guide 142 and an inner guide 144 for the cylinder 50 and there is the inner guide 144 and the outer guide 146 for the cylinder 52. In FIGURE 5 it is seen that between the guides 142 and 144, and at the left side, there is a tie-down plate 148. The plunger 112 of the cylinder 50 extends through a hole in the tie-down plate 148. It is seen that the outer end of this plunger is threaded at 150. The threaded part extends through the hole and is locked in position by means of bolts 152. In this manner the cylinder 50 is firmly positioned between the guides 142 and 144.

The outer end of the plunger 130 is threaded at 154. The threaded end 154 projects through an opening in a movable member 156. This member 156 is attached to a plate 168. In FIGURE 5 it is seen that the plate 158 projects over and beyond the guide 142 to form a lug or a wing 160. Also, it is seen in FIGURE 5 that the plate 158 overlies the guide 144. Attached to the plate 158 and also to the web 156 is a plate 162. The plate 162 runs along the side or the cylinder 50 and towards the plunger 112. Actually, it is seen in FIGURE 5 that the plate 162 or tie member 162 is positioned between the two cylinders 50 and 52 and over the guide 144. The rear part of the plate 162 is attached to a plate 164 and a web 166. In the web 166 there is an opening. The threaded end 130 of the plunger 112 of the cylinder 52 projects through the opening in the web 166 and is positioned by means of bolts 168. It is seen that the plate 164 and the web 166 are positioned between the guides 144 and 146.

The plunger 130 of the cylinder 52 has a threaded end 154. This threaded end 154 projects through a hole in the web 170 and is positioned thereby by means of nuts 172. The web 170 is attached to a plate 174. As is seen in FIGURE 5, the plate 174 projects over the guide 144 and also the guide 142 to form a lug or wing 176. By this arrangement of the cylinders and the connection means between the cylinders, it is seen that when either the plunger 112 or 130 of the cylinder 50 moves, the cylinder 52 will move a corresponding amount.

Figure 3:
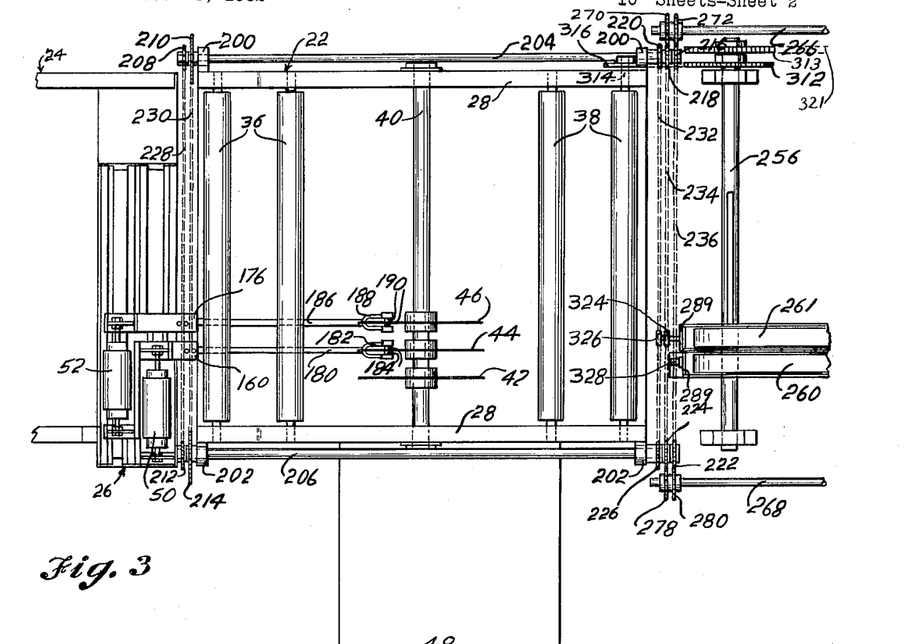
FIGURE 3, on enlarged scale, is a plan view of the edger, with the top or cover removed, and illustrates the saws, the means for positioning the saws with respect to each other, and the means for positioning the lumber conveying belts.

In FIGURE 3 it is seen that attached to the wing 160 there is an arm 180. This arm 180 projects inwardly toward the movable saw 44. On the inner end of the arm 180 there is a clevis 182 and the arms of which clevis overlie each face of the saw 44. It is seen that between the fingers of the clevis and directed inwardly are positioning pads 184. These pads are for positioning the saw 44.

Likewise, it is seen that connected to the wing 176 there is an arm 186. This arm 186 is directed towards movable saw 46. The inner end of the arm 186 terminates in a clevis 188. In the inner end of the clevis 188 there are positioning or touching pads 190. These touching pads are for contacting the faces of the saw 46 so as to move it along the shaft 40.

In FIGURE 3 it is seen that there are bearing members 200 attached to the upper side 28 of the edger, and attached to the lower side 28 of the edger there are bearing members 202. These members are near the ends of the plates 28 of the edger.

Journaled in the bearings 200 is a shaft 204. Journaled in the bearings 202 is a shaft 206. It is seen that on the left end of the shaft 204 there is a sprocket 208. The sprocket 208 may have twenty-four teeth and is keyed to the shaft. Also, it is seen that on the left end of the shaft 204 there is a sprocket 210. The sprocket 210 is an idler sprocket and may have forty-eight teeth. It is seen that on the left end of the shaft 206 there is a sprocket 212. The sprocket 212 is a twenty-four-tooth idler sprocket and is in alignment with the sprocket 208. It is seen that on the left end of the shaft 206 there is a sprocket 214. The sprocket 214 is a forty-eight tooth sprocket, is keyed to the shaft 206, and is in alignment with the sprocket 210. It is seen that on the right end of the shaft 204 there is a sprocket 216. The sprocket 216 is a twenty-four-tooth sprocket and is an idler sprocket. It is seen that on the right end of the shaft 204 there is a sprocket 218. The sprocket 218 is a forty-eight-tooth sprocket and is an idler sprocket. It is also seen that on the right end of the shaft 204 there is a sprocket 220. 220 is a twenty-four-tooth sprocket and is keyed to the shaft 204. It is seen that on the right end of the shaft 206 there is a sprocket 222. The sprocket 222 has twenty-four teeth and is keyed to the shaft 206 and is in alignment with the sprocket 216. It is seen that on the right end of the shaft 206 there is a sprocket 224. The sprocket 224 is a forty-eight tooth sprocket and is keyed to the shaft 206, and is aligned with the sprocket 218. It is seen that on the right end of the shaft 206 there is a sprocket 226. This sprocket is a twenty-four tooth sprocket and is an idler sprocket. The sprocket 226 is in alignment with the sprocket 220. A chain 228 runs between the sprockets 208 and 212. A chain 230 runs between the sprockets 210 and 214. A chain 232 runs between the sprockets 220 and 226. A chain 234 runs between the sprockets 218 and 224, and a chain 236 runs between the sprockets 216 and 222.

Figure 21:
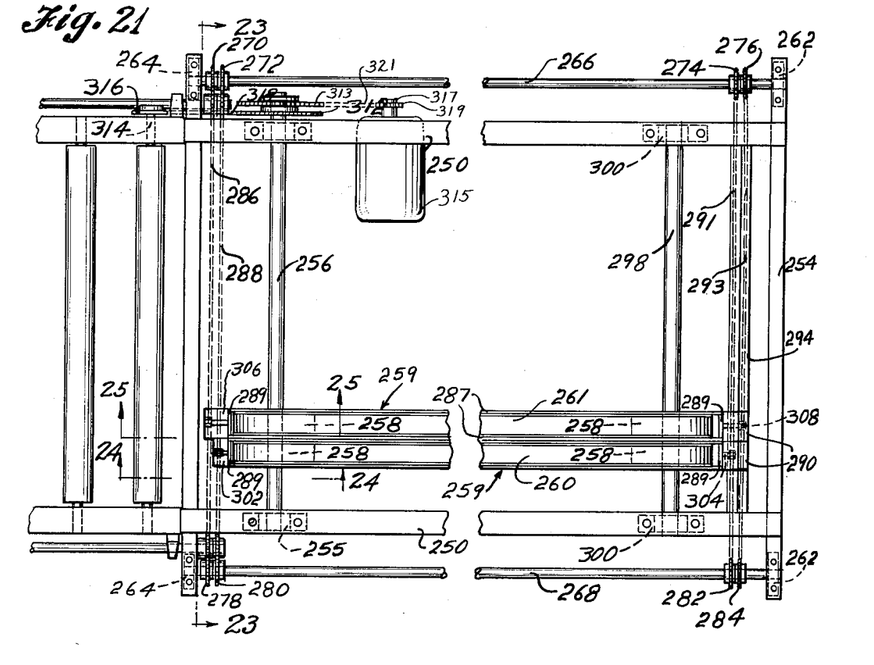
FIGURE 21 is a plan view of the discharge side or outlet side of the edging picker and illustrates the means for moving the lumber conveying belts.
Figure 22:
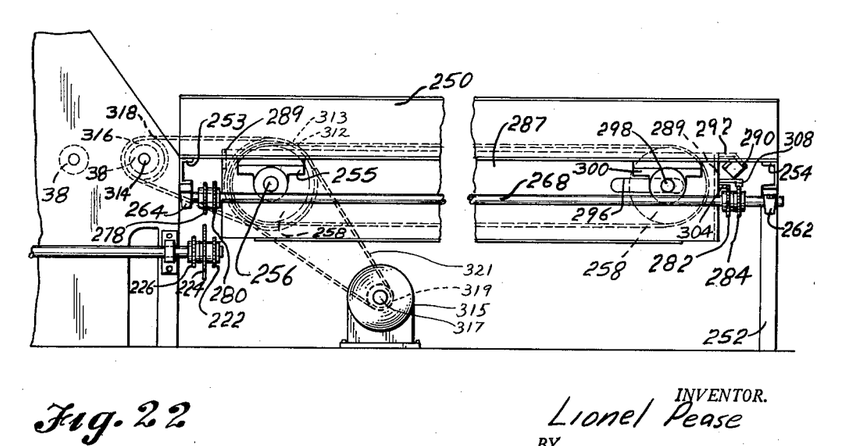
FIGURE 22 is a side elevational view of the outlet side of the edging picker and the means for moving the lumber conveying belts.
Figure 23:
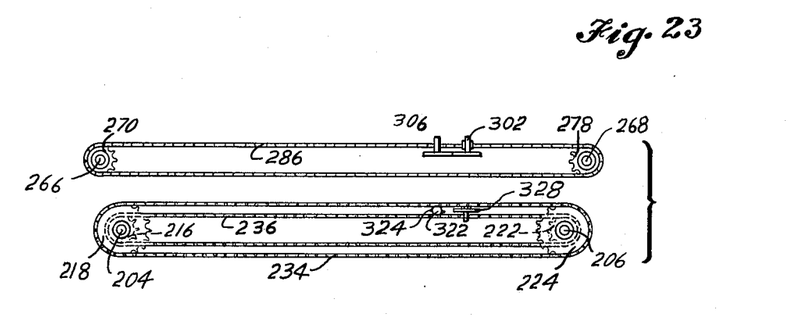
FIGURE 23, taken on line 23—23 of FIGURE 21, is an end elevational view of the lumber conveying means and illustrates the arrangement of the chains and sprockets and shafts for moving the lumber conveying belts of the edging picker proper.

The discharge table 25 for conveying and removing the sawed lumber comprises a number of belts. These belts are mounted on a frame comprising longitudinal frame members 250. The rear of the frame members 250 are supported on legs 252. The forepart of the frame members is supported on a bracing bar 253. This bar is attached to the edger 22 on the discharge side. In FIGURES 21, 22, 23, 24 and 25 there are illustrated the details of the table 25. On the outer end of the frame member 250 there is a lateral brace 254. On the underneath face of the longitudinal members 250 there are forward journals 255. Mounted in these journals is shaft 256, and on the shaft are wheels or discs 258. A first endless belt 260 runs around the first set of wheels 258 and a second endless belt 261 runs around the second set of wheels 258. On the underneath face of the lateral brace 254 there are journals 262. These journals are near the ends of the bar 254. On the underneath face of the lateral brace 253 there are journals 264. These journals are near the ends of the bar 253. The journals 262 and 264 are in alignment. With reference to FIGURE 21 it is seen that between the upper journals 262 and 264 there is a shaft 266, and between the lower journals 262 and 264 there is a shaft 268.

On the upper shaft 266 and near the bearing 264 there are two sprockets 270 and 272. The sprocket 270 is keyed to the shaft 266 and the sprocket 272 is an idler sprocket. On the shaft 266 and near the bearing 262 there are sprockets 274 and 276. The sprocket 274 is keyed to the shaft 266 and the sprocket 276 is an idler sprocket.

On the lower shaft 268 and near the bearing 264 there are two sprockets 278 and 280. The sprocket 278 is an idler sprocket and the sprocket 280 is keyed to the shaft 268. On the lower shaft 268 and near the bearing 262 there are two sprockets 282 and 284. The sprocket 282 is an idler sprocket and the sprocket 284 is keyed to the shaft 268.

An endless chain 286 runs around the sprockets 270 and 278. An endless chain 288 runs around the sprockets 272 and 280. An endless chain 291 runs around the sprockets 274 and 282. And an endless chain 293 runs around the sprockets 276 and 284. Although of secondary importance, the sprockets 270, 272, 274, 276, 278, 280, 282 and 284 may be 20-tooth sprockets and in one installation are 20-tooth sprockets.

For the conveyor belts 260 and 261 there is a supporting framework 259 which comprises two spaced-apart longitudinal side plates 287. These two plates are joined on their ends by lateral plates 289. Attached to the outside face of the outside plate 289, i.e., that plate away from the edger 22, is channel 290. This channel has its open face directed downwardly. A brace 292 connects the channel 290 with the end plate 289. The channel 290 rides on a guide 294. This guide runs between the side members 250 and is supported by them. From this it is seen that the framework 259 is supported by the axle 256 and the channel 294.

In the rear part of the side plates 287 there is a longitudinal slot 296. In cooperative relationship with this slot is a shaft 298. On the members 250 there are two journals 300. The position of the journals 300 for the shaft 298 can be varied to control the tension in the belts 260 and 261. Mounted on the shaft are discs or wheels 258. As previously stated the bolts run around the forward and rear discs 258.

With reference to FIGURES 21–25 it is seen that the frameworks 259 are tied to the chains 286, 288, 291 and 292. More particularly, the framework for the belt 260 is connected by bar 302 to the chain 288, and to the chain 291 by bar 304. And, the framework for the belt 261 is connected by bar 306 to the chain 286 and to the chain 293 by bar 308. It is seen that the bar 306 has an opening 310. The chain 288 runs through this opening 310 so as not to be connected to the framework for the belt 261.

Figure 4:
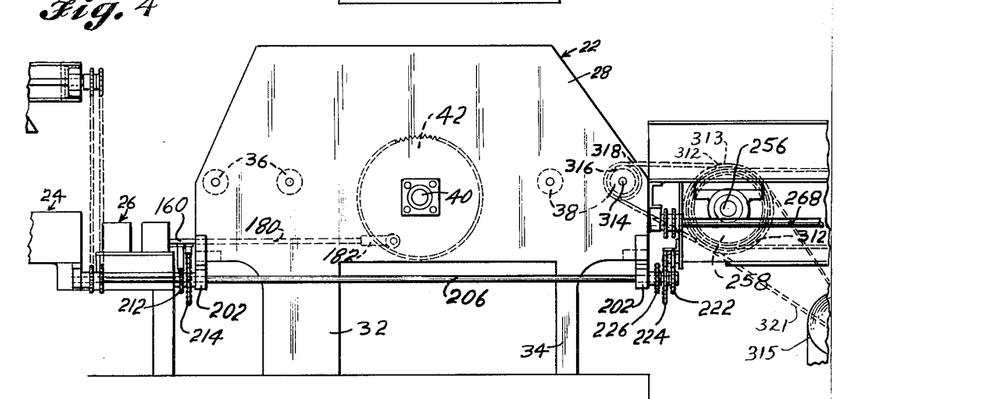
FIGURE 4 is a side elevational view of the edger and illustrates the saws, the means for positioning the saws, and the means for positioning the lumber conveying belts.

The belts 260 and 261 are moved by mechanical linkage with the edger. In FIGURE 21, it is seen that on the upper end of the shaft 256 there is a sprocket 312. Also, on the upper end of the shaft 314 of the roller 38, see FIGURES 3 and 4, there is a sprocket 316. A chain 318 connects the sprockets 312 and 316. On the end of the shaft 256, outside of the sprocket 312, there is a sprocket 313. Positioned near the sprocket 313 is a power means or motor 315 having an output shaft 317. On the end of the shaft 317 there is a sprocket 319. A chain 321 connects the sprockets 313 and 319 and the chain 321 causes the shaft 256 to rotate and the belts 260 and 261 to move. Further, with the rotation of the shaft 256 the sprocket 312 rotates. As a result the chain 318 causes the sprocket 316 to rotate and the roll 38 to rotate.

Figures 24, 25:
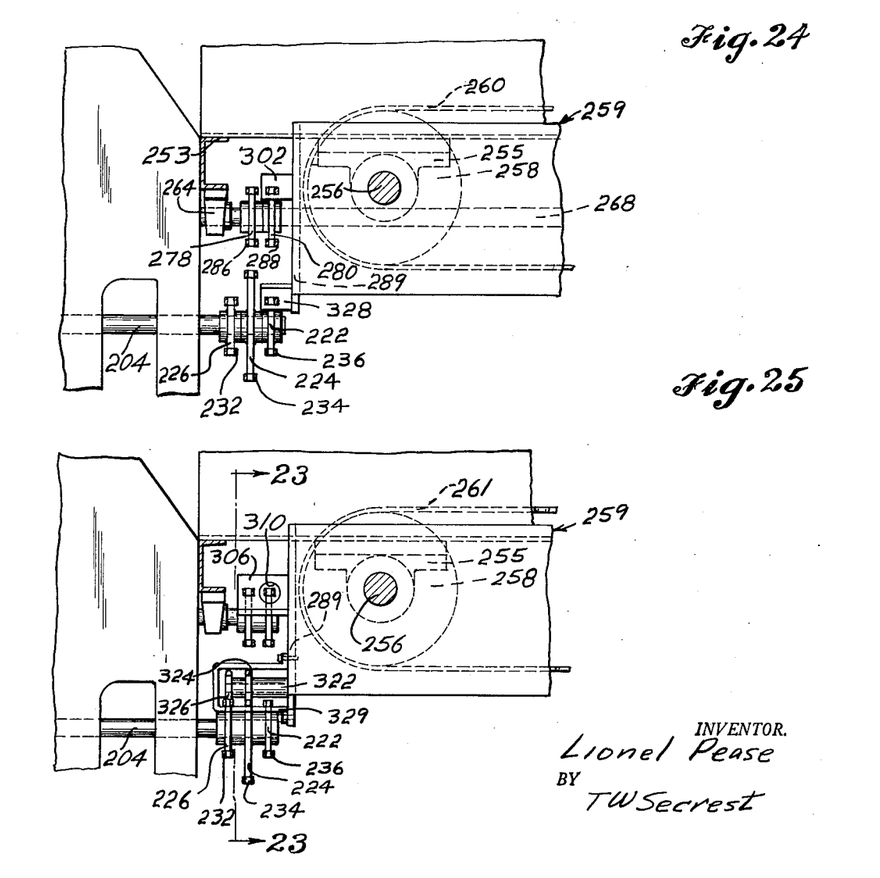
FIGURE 24, taken on line 24—24 of FIGURE 21, is a side elevational view of the front end of the mechanism for moving the lumber conveying belt.
FIGURE 25, taken on line 25—25 of FIGURE 21, is a side elevational view of the front end of the mechanism for moving the lumber conveying belt.

With respect to the operation of the edging picker in regard to the movement of the saws and the movement of the discharge belts 260 and 261 and related assemblies, attention is directed to FIGURES 3, 9, 10, 11, 12, and 28. In FIGURE 3 it is to be seen that the two movable saws 44 and 46 are positioned close to the fixed saw 42. The belt 260 is substantially mid-position between the fixed saw 42 and the first movable saw 44. Likewise, the belt 261 is positioned so as to be substantially between the first movable saw 44 and second movable saw 46, the belt 261 should move so as to be substantially mid-position between the first movable saw 44 and the second movable saw 46. It is desired to move the saw 46 with respect to the saw 44, but to maintain the saw 44 in its same position with respect to the fixed saw 42. Therefore, the cylinder 52 is actuated so as to extend the plunger 130 indicated in FIGURE 9. The plunger 130 is attached to the chain 228, see FIGURE 12. The chain 228 runs around the sprocket 208 and which sprocket is keyed to the shaft 204. The sprocket 220 is keyed to the shaft 204. However, the sprockets 218 and 216 are idler sprockets with respect to the shaft 204. The sprocket 220 is associated with the chain 232 and the chain 234 is associated with the sprocket 218. With the movement of the chain 228, the sprockets 208 and 220 are rotated so as to move the chain 232. With reference to FIGURE 25 it is seen that the assembly for the belt 261 comprises a jackshaft 322 on the exposed face of the front plate 289. On this shaft are two sprockets 324 and 326. The sprocket 324 meshes with the chain 234 and the sprocket 326 meshes with the chain 232. The sprocket 326 rides on the chain 232 and the sprocket 324 is underneath the chain 234. Also, there is provided a keeper 328 to assist in keeping the chains from jumping off of the sprockets. In this particular instance, with the movement of the chain 228, the chain 232 moves but the chain 234 is stationary. Therefore, with the movement of the chain 232 the sprockets 326 and 324 also rotate. But, the second belt assembly 261 moves one-half the distance that the plunger 130 or the second movable saw 46 moves. The reason for the assembly 261 moving only one-half the distance is that the chain 232 is a live chain and the chain 234 is a dead chain. Therefore, upon the final positioning of the saw 46 with respect to the saw 44, the movable belt assembly 261 will be substantially mid-position between these two saws or midway between them. In FIGURE 25 it is seen that there is a keeper 329 for the sprockets 324 and 326 and the chains 232 and 234.

With the movement of the assembly 261 by means of the chains 232 and 234 and the sprockets 326 and 324 it is seen that the chain 286 moves. As a result the shafts 266 and 268 rotate so as to move the chain 293. In this both the forward and the rear portions of assembly 261 are simultaneously moved the same distance.

Figure 10:
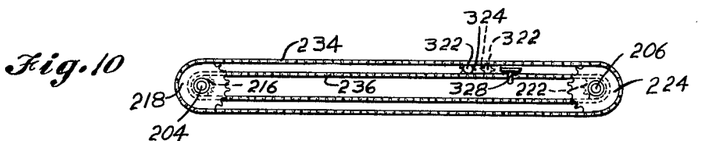
FIGURE 10, taken on line 10—10 of FIGURE 9, illustrates the position of the chains and the sprockets for the feed means so as to position the second outlet belt between the first and second movable saws.
Figure 11:
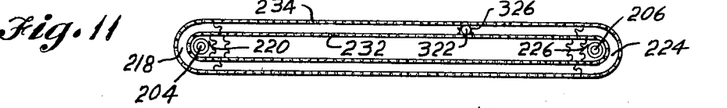
FIGURE 11, taken on line 11—11 of FIGURE 9, illustrates the chains and the sprockets for positioning the first outlet belt with respect to the stationary saw and the first movable saw.
Figure 12:
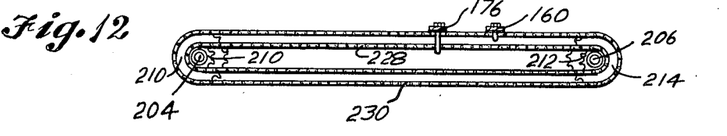
FIGURE 12, taken on line 12—12 of FIGURE 9, illustrates the chains and the sprockets and the position of the controls attached to the fluid-actuating cylinders for controlling the position of the movable saws and the movable outlet means.

In FIGURES 10, 11 and 12 there is illustrated the positions of the tie-members and the chains. FIGURE 10 illustrates the initial and final positions of the tie-member 328 for the belt assembly 260 and the sprocket 324 for the belt assembly 261. In FIGURE 11 there is illustrated the final position of the sprocket 326 for the belt assembly 261. And in FIGURE 12 there is illustrated the final position for the keeper 160 associated with the chain 230 and the cylinder 50 and, through mechanical linkage, with the belt assembly 260; and, the final position for the keeper 176 associated with the belt 228 and the cylinder 52 and, through mechanical linkage, with the belt assembly 261.

Figure 9:
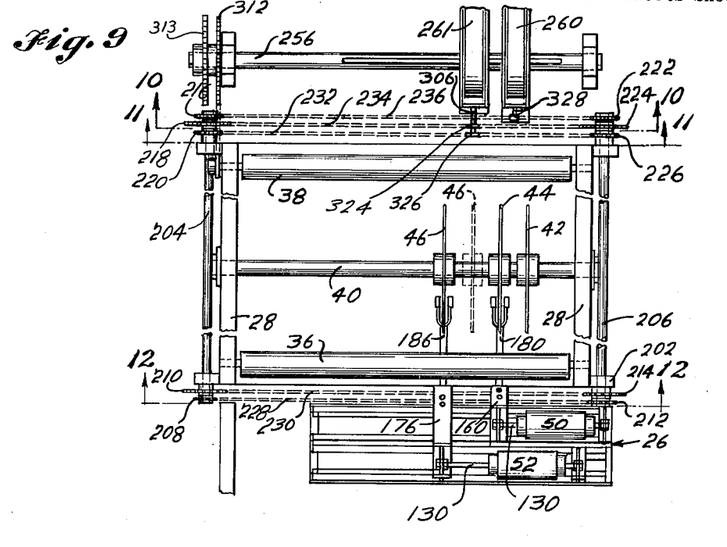
FIGURE 9 is a plan view of the edger, with the cover removed, and illustrates a first position for the stationary and the two movable saws in the edger.
Figure 13:
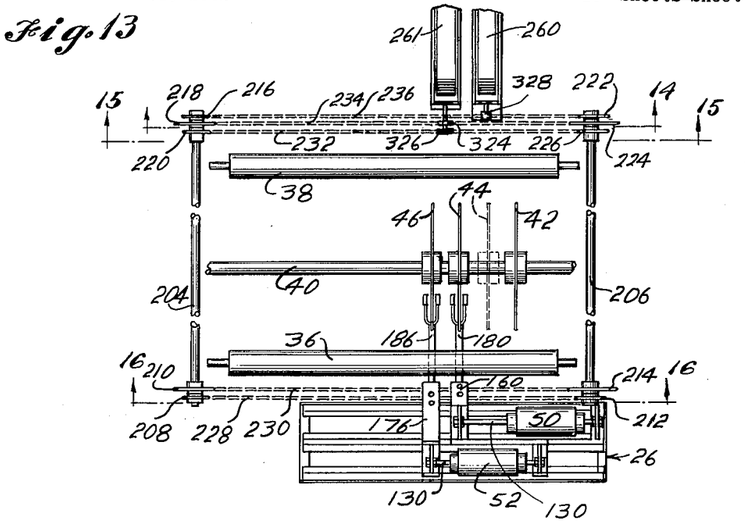
FIGURE 13 is a plan view of the edger, with the cover removed, and illustrates the position of the saws with the first movable saw being spaced apart from the fixed saw and adjacent the second movable saw.
Figure 29:
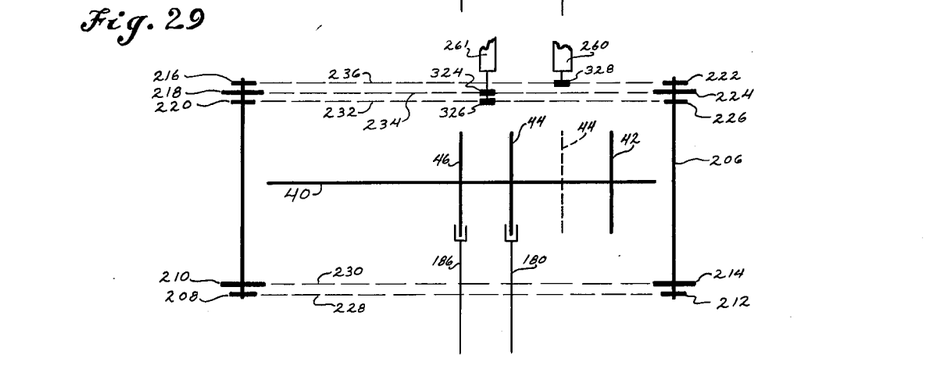
FIGURE 29 is a schematic illustration of FIGURE 13 and illustrates the position of the saws with the first movable saw being spaced apart from the fixed saw and adjacent the second movable saw; and, FIGURE 30 is a schematic illustration of FIGURE 17 and illustrates the first movable saw positioned away from the fixed saw and the second movable saw spaced apart from the first movable saw.

In another illustration, see FIGURES 13 and 29, the second movable saw 46 is not moved, but the first movable saw 44 is moved from the phantom line position as illustrated in FIGURE 13 to the solid line position. A comparison of FIGURES 13 and 9 shows that the first movable saw 44 is moved toward the second movable saw 46. In this instance, the second movable assembly for the belt 261 is moved to occupy a position substantially midway between the two saws 46 and 44, and the first movable belt assembly is moved to occupy a position between the two saws 44 and 42. Prior to movement of the saw 44 and the assembly 260 the position of these two is shown in FIGURE 9 wherein the saw 44, in phantom, is positioned near the saw 42 and the assembly 260 is positioned between these two saws.

The saw 44 is moved by extending the plunger 130 of the fluid cylinder 50. With the extension of the plunger 130, the chain 230 is moved so as to rotate the sprocket 214 and the shaft 206. It is to be recalled that the sprocket 210 on the shaft 204 is an idler sprocket. The sprocket 214 is keyed to the shaft 206. With the rotation of the shaft 206, the sprockets 224 and 222 are rotated. This moves the chain 236. The assembly associated with the belt 260 is tied by the keeper 328 to the chain 236 and with the movement of the chain 236 the assembly moves. Also, this assembly is tied by 302 to the chain 288. As is recalled the chain 288 meshes with the sprocket 280 and which sprocket is keyed to the shaft 268. Also, keyed to the shaft 268 is the sprocket 284. This sprocket meshes with the chain 291 and which chain is tied at 304 to the back part of the assembly for the belt 260. Again, it is seen with the movement of the forepart of the assembly there is a simultaneous and corresponding movement of the rear part of the assembly so that the final position of the assembly is somewhat midway between the two saws 42 and 44.

With reference to FIGURES 9, 13, 17, 28, 29, and 30 it is seen that the setting of the saws for new cuts may be accomplished in a number of ways. One of the most direct ways is to move the saws 44 and 46 to an initial position with respect to the saw 42 and then to reset the saws 44 and 46. For example, to move the saws 44 and 46 from the position shown in FIGURE 9 to the position shown in FIGURE 17 the saws 44 and 46 are first moved toward the saw 42 and then the saws 44 and 46 are moved away from the saw 42. In a sequence of steps the plungers 130 of the cylinders 50 and 52 are retracted to move the saws 44 and 46 toward the saw 42. Then, the plungers 130 are extended. More particularly, the plunger 130 of the cylinder 50 is extended and the saw 44 is moved and the chain 230 is moved and the sprocket 214 is rotated. The shaft 206 rotates and rotates the sprocket 222 and the chain 236. The sprocket 222 has half the number of teeth that the sprocket 214 has. As a result the chain 236 moves one-half the distance that the chain 230 moves. The belt assembly 260 is tied by tie-member to the chain 236. As a result the assembly 260 moves one-half the distance that the saw 44 moves. The chain 234 moves the same distance that the chain 230 moves as the sprocket 224 has the same number of teeth as the sprocket 214. The sprocket 324 is rotated by the movement of the chain 234, and moves the same distance as the saw 44. It is to be remembered that the sprocket 324 is on the shaft 322 and that the sprocket 326 is also on the shaft 322. As a result the belt assembly 261 moves the same distance as the saw 44. At this time the saws 42, 44 and 46 are in the same relative positions as illustrated in FIGURE 13. The saw 46 is moved to the position shown in FIGURE 17 by extending the plunger 130 of the cylinder 52. This moves the chain 228, rotates the sprocket 208, the shaft 204 and the sprocket 220. The chain 232 is moved and the sprocket 326 is rotated. Again the sprocket 326 and 324 are on the shaft 322. As a result the sprocket 326 moves one-half the distance that the saw 46 moves so as to occupy a final position substantially mid-way between the saws 44 and 46.

Figure 14:
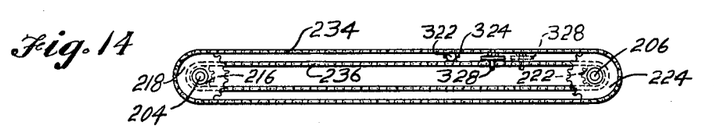
FIGURE 14, taken on line 14—14 of FIGURE 13, illustrates the chains and the position of the sprockets with respect to the chains and the position of the second movable outlet belt with respect to the first and second movable saws.
Figure 15:
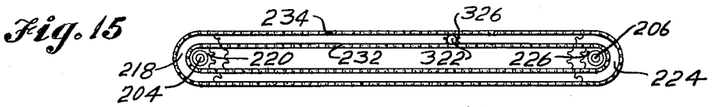
FIGURE 15, taken on line 15—15 of FIGURE 13, illustrates the position of the chains and the sprockets and the second movable outlet belt with respect to the position of the fixed saw and the first movable saw.
Figure 16:
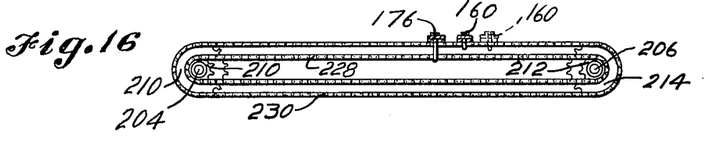
FIGURE 16, taken on line 16—16 of FIGURE 13, illustrates the positions of the chains and sprockets and the attaching means to the chains for positioning the first and second movable saws.

In FIGURES 14, 15 and 16 there is illustrated the positions of the tie-members and the chains. FIGURE 14 illustrates the initial and final positions of the tie-member 328 for the belt assembly 260, and the final position of the sprocket 324 for the belt assembly 261. In FIGURE 15 there is illustrated the final position of the sprocket 326 associated with the belt assembly 261. And, in FIGURE 16 there is illustrated the keeper 160 associated with the chain 230 and the cylinder 50 and, through mechanical linkage, with the belt assembly 260; and, the keeper 176 associated with the chain 228 and the cylinder 52 and, through mechanical linkage, with the belt assembly 261.

Figure 17:
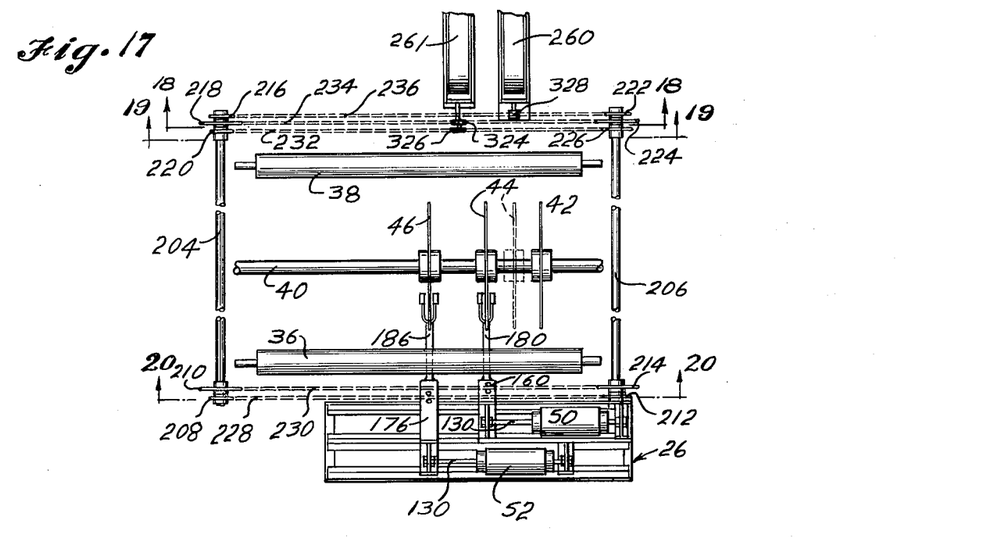
FIGURE 17 is a schematic plan view of the edger and illustrates the first movable saw positioned away from the fixed saw and the second movable saw spaced apart from the first movable saw.
Figure 30:
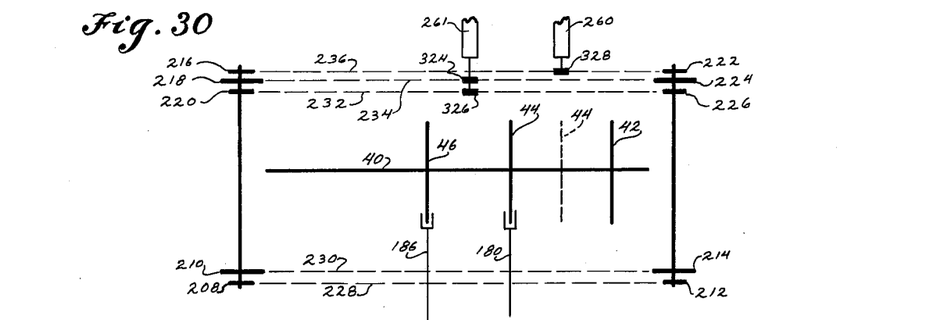

In FIGURES 17 and 30 there is illustrated the movement of the two saws 46 and 44. The saws 46 and 44 retain the same relative position with respect to each other, but these saws are moved so as to have a new position with respect to the fixed saw 42. In this instance, the plunger 130 of the fluid actuated cylinder 52 is not moved. The plunger 130 of the fluid actuated cylinder 50 is moved. With the actuation of the cylinder 50 and the movement of the plunger 130 the cylinder 52 is moved. See connecting arm 162 which connects the plate 158, associated with the plunger 130 of the cylinder 50, to the plate 164, associated with the plunger 112 of the cylinder 52.

With the extension of the plunger 130 of the fluid actuated cylinder 50, the chain 230 is caused to move so as to rotate the sprocket 214. Likewise, the shaft 206 and the sprocket 224 are rotated. With the rotation of the sprocket 224 the chain 234 moves. Also, with the movement of the cylinder 52, the chain 228 is caused to move so as to rotate the sprocket 208. This causes the shaft 204 and the sprocket 220 to rotate. With the rotation of the sprocket 220 the chain 232 moves. As is appreciated the chains 232 and 234 move in the same direction. Also, with the rotation of the shaft 206 the sprocket 222 moves. This moves the chain 236 and the belt assembly 260 away from the saw 42. The belt assembly 260 finally occupies a position between the two saws 42 and 44. With the movement of the two chains 232 and 234 the sprockets 324 and 326 rotate so as to move the belt assembly 261 away from the saw 42 and to occupy a position between the two saws 44 and 46.

Figure 18:
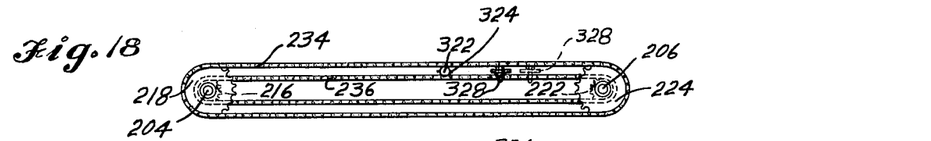
FIGURE 18, taken on line 18—18 of FIGURE 17, illustrates the chains and the sprockets and the position of the sprockets connected with the first movable outlet means and which outlet means is positioned between the fixed saw and the first movable saw.
Figure 19:
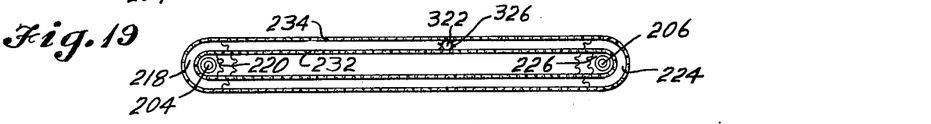
FIGURE 19, taken on line 19—19 of FIGURE 17, illustrates the chains and the sprockets and the position of the sprocket connected with the second movable outlet means and which outlet means is positioned between the first movable and the second movable saw.
Figure 20:
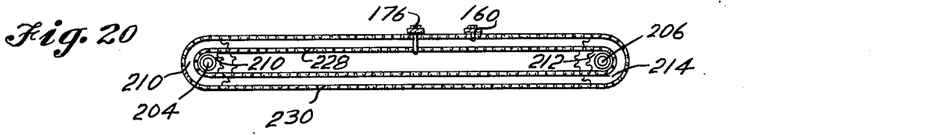
FIGURE 20, taken on line 20—20 of FIGURE 17, illustrates the chains and the sprockets and the means for attaching the positioning means for the first and second movable saws to said chains.

In FIGURES 19, 20 and 18 there is illustrated the position of the tie members and the chains. FIGURE 18 illustrates the initial and final positions of the tie member 328 for the belt assembly 260, and the final position of the sprocket 324 for the belt assembly 261. In FIGURE 19 there is illustrated the final position of the sprocket 326 associated with the belt assembly 261. And, in FIGURE 20, there is illustrated the keeper 160 associated with the chain 230 and the cylinder 50 and, through mechanical linkage, with the belt assembly 260; and, the keeper 176 associated with the chain 228 and the cylinder 52 and, through mechanical linkage, with the belt assembly 261.

Figures 26, 27:
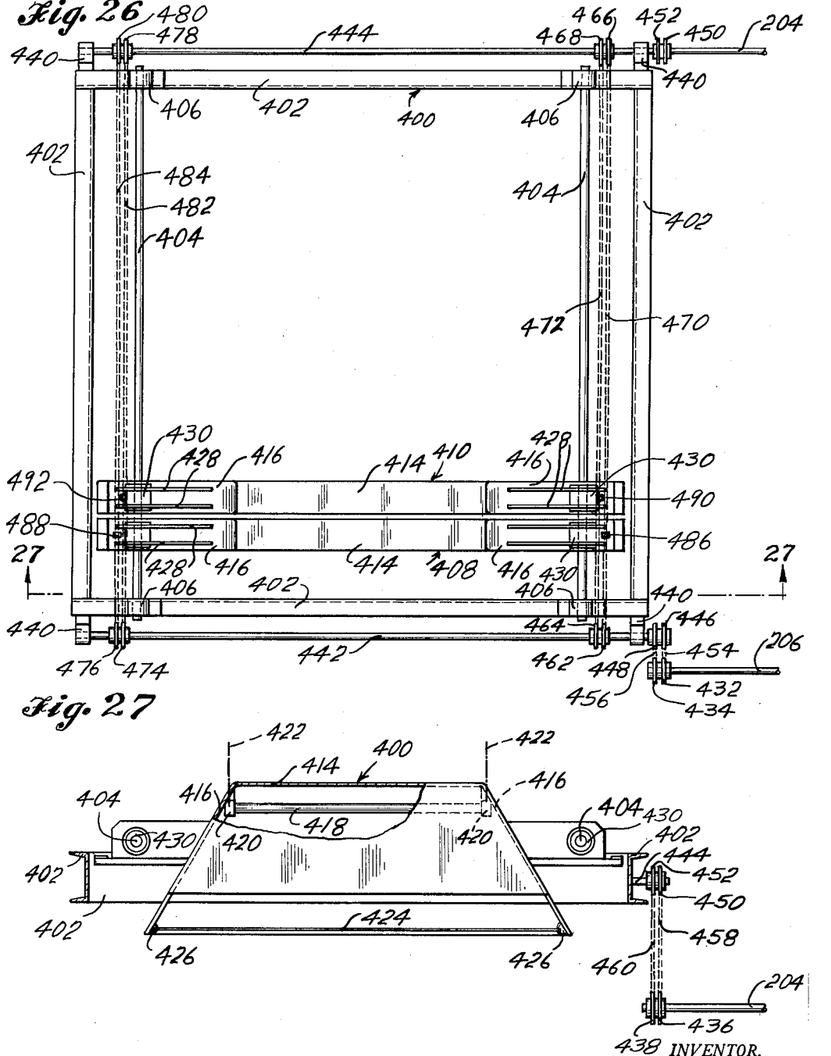
FIGURE 26, is a plan view, with the cover removed, of the hairline apparatus for casting a hairline shadow on the lumber to be sawed.
FIGURE 27 is a side elevational view of the hairline apparatus and the means for moving the light boxes off of the edger setworks.
Figure 28:
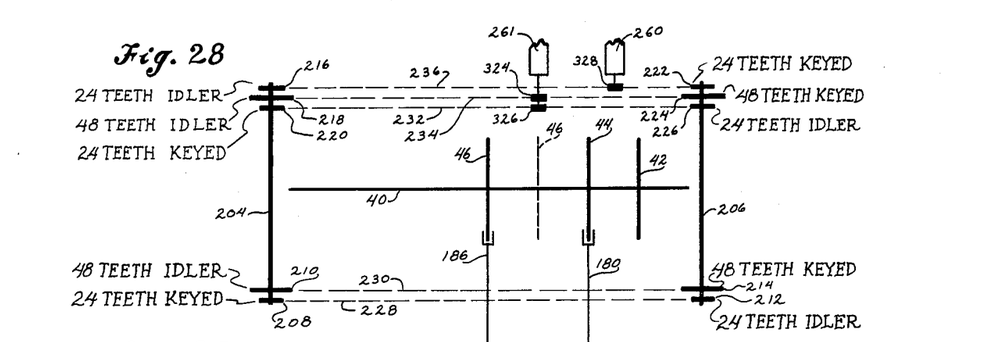
FIGURE 28 is a schematic illustration of FIGURE 9 and illustrates a first position for the stationary and the two movable saws in the edger.

In FIGURES 26 and 27 there is illustrated a shadow line assembly 400. This assembly comprises a framework composed of channel members 402. As is seen in FIGURE 26 these four members 402 are joined near their ends to form an enclosed square or rectangular frame. Near each end of the frame is a shaft 404, i.e., spaced apart shafts 404. The ends of these shafts 404 are journaled at 406 in the outside frame member 402.

Carried on the two shafts 404 are light boxes 408 and 410. These two light boxes are of the same construction and like reference numerals will be used for like parts. The light box 408 is connected by mechanical linkage with the saw 44 and corresponds to the position of this saw. Likewise, the light box 410 is connected by mechanical linkage to the saw 46 and corresponds to the line on the lumber to be sawed; and this shadow line will correspond to the position that the saw 44 will cut the lumber or make a saw kerf in the lumber. Likewise, the light box 410 will cast a shadow line on the lumber to be sawed, which shadow line will correspond to the position that the saw 46 will form a kerf in the lumber. The shadow boxes 408 and 410 comprise what are, in effect, a sheet-metal hood. The sheet-metal hood has two sides 412, a top 414, and two ends 416. The bottom of the hood is open. In the upper part of the hood or near the top 414 there is a long tubular light 418. This light is carried by electrical connectors 420 which are secured to the light box 408 and 410. It is seen that there are lead-in wires 422 for each light box. In the bottom of the light box there is a hairline material such as a thin string or a fine wire 424. This is stretched between the lower edges of the two ends 416. It is seen that there is a keeper 426 connected with each end 416 so as to stretch tight the wire or string 424. Attached to the outside face of each end 416 is a set of arms. In FIGURES 26 and 27 it is seen that on each of the outside ends of the faces 416 there are two outwardly projecting arms 428. These arms 428 are spaced apart and in the arms are journals 430. The shafts 404 are journaled in 430. The shadow line assemblies 408 and 410 are moved on the shafts 404. In addition to the two movable assemblies 408 and 410, there may be a fixed shadow line assembly to correspond to the position of the fixed saw 42.

Figure 1:
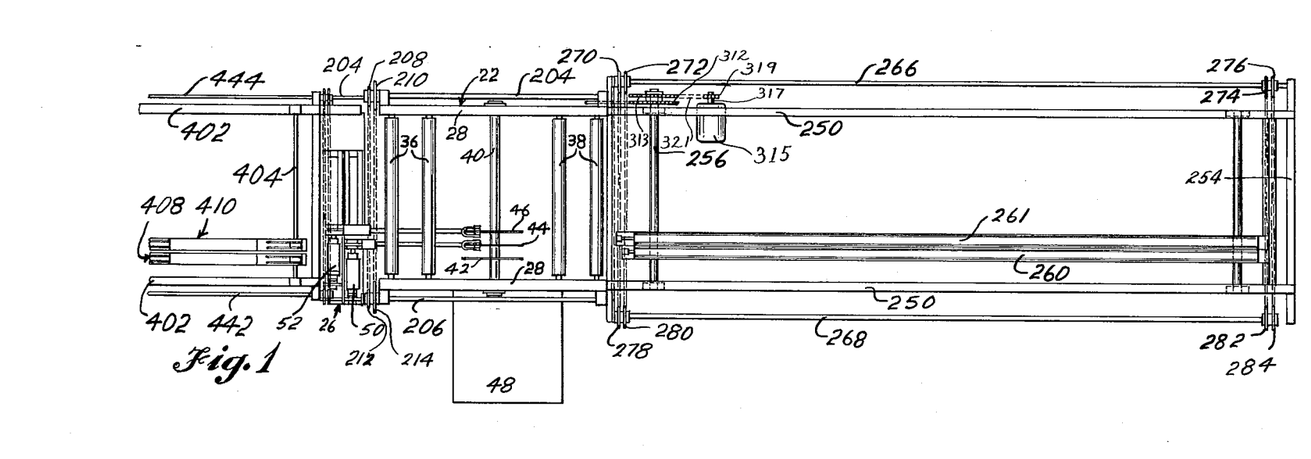
FIGURE 1 is a plan view of the edger, and with the cover of the same removed, to show the saw positioning means and the lumber conveying belts.
Figure 2:
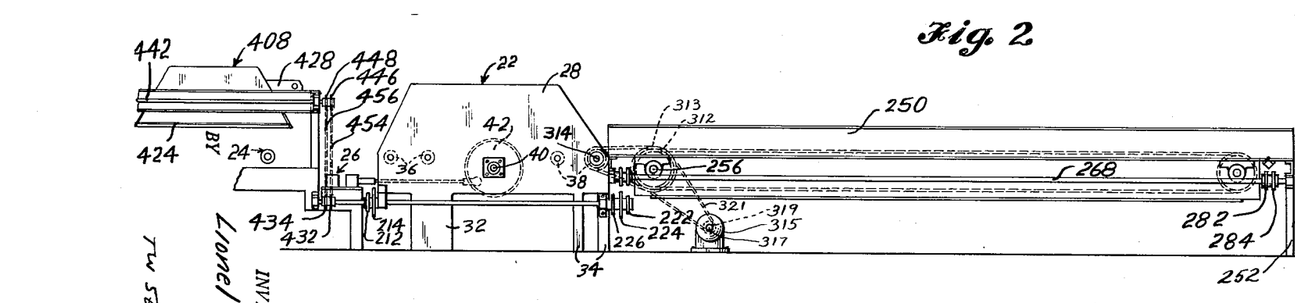
FIGURE 2 is a side elevational view of the edger and shows the saw, in phantom, positioning means for the saw and the lumber conveying belts.

The means for moving the assemblies 408 and 410 is a mechanical linkage off the shafts 204 and 206. More particularly, it is seen that the shafts 204 and 206, see FIGURES 1 and 2, extend away from the edging picker 22 and towards the feed table over which is positioned the assembly 400. On the end of the shaft 206 there are two sprockets 432 and 434. The sprocket 432 is keyed to shaft 206 and the sprocket 434 is an idler sprocket. Also, it is seen that on the end of the shaft 204 there is a sprocket 436 and a sprocket 438. The sprocket 438 is keyed to the shaft 204 and the sprocket 436 is an idler sprocket. It is seen in FIGURE 26 that on the outside of one of the frame members 402 that there are spaced-apart journals 440 and a shaft 442 is journaled therein. Also, it is seen that on the outside of the other side member 402 there are journals 440 and a shaft 444 is journaled therein. On the shaft 442, and near the edging picker 22, there are sprockets 446 and 448. The sprocket 446 is keyed to the shaft 442 and the sprocket 448 is an idler sprocket. On that end of the shaft 444 near the edging picker 22 there are sprockets 450 and 452. The sprocket 450 is an idler sprocket and the sprocket 452 is keyed to the shaft 444. It is seen that the sprockets 446 and 450 are in alignment and that the sprockets 448 and 452 are in alignment. Further, sprockets 432 and 446 are in alignment, and sprockets 434 and 448 are in alignment. A chain 454 runs between the sprockets 432 and 446 and a chain 456 runs between the sprockets 434 and 448. The sprockets 436 and 450 are in alignment and the sprockets 438 and 452 are in alignment. A chain 458 runs between the sprockets 436 and 450 and a chain 460 runs between the sprockets 438 and 452. On the shaft 442 and near the edging picker 22, but between the journals 440, there are sprockets 462 and 464. The sprocket 462 is keyed to 442 and the sprocket 464 is an idler sprocket. On the shaft 444, and near the edging picker 22, but between the journals 440, there are sprockets 466 and 468. The sprocket 466 is an idler sprocket and sprocket 468 is keyed to the shaft 444. The sprockets 462 and 466 are in alignment, and the sprockets 464 and 468 are in alignment. A chain 470 runs between the sprockets 462 and 466 and a chain 472 runs between the sprockets 464 and 468.

On the shaft 442 near that end away from the edging picker 22 there are sprockets 474 and 476. The sprocket 476 is keyed to the shaft 442 and the sprocket 474 is an idler sprocket. On the shaft 444 on that end away from the edging picker 22, there are sprockets 478 and 480. The sprocket 480 is an idler sprocket, and sprocket 478 is keyed to the shaft. It is seen that the sprockets 474 and 478 are in alignment and that the sprockets 476 and 480 are in alignment. A chain 482 runs around the sprockets 474 and 478 and a chain 484 runs around the sprockets 476 and 480.

The shadow line assembly 408 is tied to the chain 470 by keeper 486 and is tied to the chain 484 by keeper or tie member 488. The shadow line assembly 410 is tied to the chain 472 by keeper 490 and is tied to the chain 482 by keeper 492.

It is seen that from the above mechanical linkage that a movement of the plunger 112 and the cylinder 50 that there is a movement of the saw 44, a movement of the assembly of the belt 260, and also a movement of the shadow line assembly 408. More particularly, it is seen that with a movement of the plunger 130 of the cylinder 50 that the shaft 206 is caused to rotate because of the movement of the chain 230. This rotation is carried through the sprocket 432, chain 454, sprocket 446, shaft 442, sprocket 462 and chain 470, and sprocket 476 and chain 484. It is to be recalled that the chains 470 and 484 are tied to the shadow line assembly 408. Likewise, with a movement of the cylinder 52 there is a movement of the chain 228, the saw 46, the assembly for the belt 261, and the shadow line assembly 410. More particularly, with the movement of the belt 228, there is rotation of the shaft 444. This rotation is transmitted through the sprockets 438 and 452 and the chain 460. The shaft 444 is rotated. As a result, the sprockets 468 and 478 are caused to rotate and the chains 472 and 482 are caused to move. It is recalled that the chains 472 and 482 are tied to the shadow line assembly 410, and with the movement of the chains 472 and 482 there is a movement of 410.

Having presented my invention I claim:

1. A sawmill edger, said sawmill edger comprising a plurality of rotatable saws capable of being moved laterally to adjust the space therebetween, a plurality of cylinders, having plungers, mechanical means connecting the plungers of the cylinders with the saws so as to move the saws in response to the movement of the plungers, a means for removing lumber from said sawmill edger, said means comprising belts for removing lumber from the edger and said belts being capable of being moved laterally with respect to the movement of the saws, and mechanical means connecting said plungers and said belts so as to move the belts in response to the movement of the plungers and with respect to said saws.

2. A sawmill edger, said edger comprising:
 (a) a main shaft;
 (b) a plurality of movable saws on said main shaft;
 (c) a combination of a first and a second fluid actuated cylinder;
 (d) each of said cylinders having a movable plunger with the first cylinder being connected to the second cylinder;
 (e) a first means connecting the plunger of the first fluid actuated cylinder and a first movable saw of said plurality of movable saws;
 (f) a second means connecting the plunger of the second fluid actuated cylinder and a second movable saw of said plurality of movable saws;
 (g) a first shaft and a second shaft;
 (h) a first sprocket fixed to the first shaft and a second sprocket freely rotatable on the first shaft;
 (i) a third sprocket fixed to the second shaft and a fourth sprocket freely rotatable on the second shaft;
 (j) a first chain connecting the first and fourth sprockets;
 (k) a second chain connecting the second and third sprockets;
 (l) a third means connecting the plunger of the first fluid actuated cylinder to the first chain;
 (m) a fourth means connecting the plunger of the second fluid actuated cylinder to the second chain;
 (n) a fifth sprocket fixed to the first shaft;
 (o) a sixth sprocket fixed to the second shaft;
 (p) a shadow line apparatus comprising a first lamp assembly and a second lamp assembly with each lamp assembly having means to cast a shadow line, and a third shaft and a fourth shaft;
 (q) a seventh sprocket fixed to the third shaft;
 (r) an eighth sprocket fixed to the fourth shaft;
 (s) a third chain connecting the fifth and the seventh sprockets;
 (t) a fourth chain connecting the sixth and the eighth sprockets;
 (u) a ninth sprocket fixed to the third shaft and a tenth sprocket freely rotatable on the third shaft;
 (v) an eleventh sprocket fixed to the fourth shaft and a twelfth sprocket freely rotatable on the fourth shaft;
 (w) a fifth chain connecting the ninth sprocket and the twelfth sprocket;
 (x) a sixth chain connecting the tenth sprocket and the eleventh sprocket;
 (y) said first lamp assembly connecting with the fifth chain so as to move in conjunction with the movement of the first saw; and,
 (z) said second lamp assembly connecting with the sixth chain so as to move in conjunction with the movement of the second saw.

3. A sawmill edger, said edger comprising:
 (a) a main shaft;
 (b) a plurality of laterally movable saws on said main shaft;
 (c) a first means to move a first movable saw of said plurality of movable saws;
 (d) a second means to move a second movable saw of said plurality of movable saws;
 (e) a discharge assembly for removing lumber from the vicinity of the saws;
 (f) said discharge assembly comprising a laterally adjustable first belt assembly and a laterally adjustable second belt assembly;
 (g) each of said belt assemblies comprising a frame, two spaced-apart wheels and a belt running around said wheels;
 (h) a third means connecting the first means and a first belt assembly so that the belt assembly moves in conjunction with the movement of and with respect to the first movable saw; and,
 (i) a fourth means connecting the second means and a second belt assembly so that the belt assembly moves in conjunction with the movement of and with respect to the second movable saw.

4. A sawmill edger, said edger comprising:
 (a) a main shaft;
 (b) a plurality of laterally movable saws on said main shaft;
 (c) a combination of a first and a second fluid actuated cylinder;
 (d) each of said cylinders having a movable plunger with the first cylinder being connected to the second cylinder;
(e) a first means connecting the plunger of the first fluid actuated cylinder and a first movable saw of said plurality of movable saws;
(f) a second means connecting the plunger of the second fluid actuated cylinder and a second movable saw of said plurality of movable saws;
(g) a discharge assembly for removing lumber from the vicinity of the saws;
(h) a support in said discharge assembly;
(i) said discharge assembly comprising a laterally adjustable first belt assembly and a laterally adjustable second belt assembly;
(j) each of said belt assemblies comprising a frame, two spaced-apart wheels and a belt running around said wheels;
(k) a third means connecting the first cylinder and the first belt assembly so that the belt assembly moves in conjunction with the movement of and with respect to the first movable saw; and,
(l) a fourth means connecting the second cylinder and the second belt assembly so that the belt assembly moves in conjunction with the movement of and with respect to the second movable saw.

5. A sawmill edger, said edger comprising:
(a) a main shaft;
(b) a plurality of movable saws on said main shaft;
(c) a first fluid actuated cylinder and a second fluid actuated cylinder;
(d) a first means connecting the first fluid actuated cylinder and a first movable saw of said plurality of movable saws;
(e) a second means connecting the second fluid actuated cylinder and a second movable saw of said plurality of movable saws;
(f) each of said cylinders having a movable plunger with the first cylinder being connected to the second cylinder;
(g) a first shaft and a second shaft;
(h) a first sprocket fixed to the first shaft and a second sprocket freely rotatable on the first shaft;
(i) a third sprocket fixed to the second shaft and a fourth sprocket freely rotatable on the first shaft;
(j) a first chain connecting the first and fourth sprockets;
(k) a second chain connecting the second and third sprockets;
(l) a third means connecting the plunger of the first fluid actuated cylinder to the first chain;
(m) a fourth means connecting the plunger of the second fluid actuated cylinder to the second chain;
(n) a fifth sprocket freely rotatable on the first shaft, and sixth and seventh sprockets fixed to the first shaft;
(o) an eighth sprocket fixed to the second shaft, and ninth and tenth sprockets freely rotatable on the second shaft;
(p) a third chain connecting the fifth and eighth sprockets;
(q) a fourth chain connecting the sixth and ninth sprockets;
(r) a fifth chain connecting the seventh and tenth sprockets;
(s) a discharge assembly for removing lumber from the vicinity of the saws;
(t) a support in said discharge assembly;
(u) said discharge assembly comprising a first belt assembly and a second belt assembly;
(v) said belt assemblies comprising a frame, two spaced-apart wheels and a belt running around said wheels;
(w) said belt assembly capable of moving on said support;
(x) a first belt assembly having a stud shaft, a sprocket on said stud shaft, and said sprocket co-fitting with said fifth chain; and,
(y) a second belt assembly having a stud shaft, a first sprocket and a second sprocket on said stud shaft, said first sprocket co-fitting with the third chain, and said second sprocket co-fitting with the fourth chain.

6. A sawmill edger, said edger comprising:
(a) a main shaft;
(b) a plurality of laterally movable saws on said main shaft;
(c) a first means to move a first movable saw of said plurality of movable saws;
(d) a second means to move a second movable saw of said plurality of movable saws;
(e) a discharge assembly for removing lumber from the vicinity of the saws;
(f) said discharge assembly comprising a laterally adjustable first belt assembly and a laterally adjustable second belt assembly;
(g) each of said belt assemblies comprising a frame, two spaced-apart wheels and a belt running around said wheels;
(h) a third means connecting the first means and a first belt assembly so that the belt assembly moves in conjunction with the movement of and with respect to the first movable saw;
(i) a fourth means connecting the second means and a second belt assembly so that the belt assembly moves in conjunction with the movement of and with respect to the second movable saw;
(j) a shadow line apparatus comprising a first lamp assembly and a second lamp assembly with each lamp assembly having means to cast a shadow line;
(k) a fifth means connecting the first means with the first lamp assembly so as to move said assembly in conjunction with the movement of the first saw; and,
(l) a sixth means connecting the second means with the second lamp assembly so as to move said assembly in conjunction with the movement of the second saw.

7. A sawmill edger, said edger comprising:
(a) a main shaft;
(b) a plurality of laterally movable saws on said main shaft;
(c) a combination of a first and a second fluid actuated cylinder;
(d) each of said cylinders having a movable plunger with the first cylinder being connected to the second cylinder;
(e) a first means connecting the plunger of the first fluid actuated cylinder and a first movable saw of said plurality of movable saws;
(f) a second means connecting the plunger of the second fluid actuated cylinder and a second movable saw of said plurality of movable saws;
(g) a discharge assembly for removing lumber from the vicinity of the saws;
(h) a support in said discharge assembly;
(i) said discharge assembly comprising a laterally adjustable first belt assembly and a laterally adjustable second belt assembly;
(j) each of said belt assemblies comprising a frame, two spaced-apart wheels and a belt running around said wheels;
(k) a third means connecting the first cylinder and the first assembly so that the belt assembly moves in conjunction with the movement of and with respect to the first movable saw;
(l) a fourth means connecting the second cylinder and the second belt assembly so that the belt assembly moves in conjunction with the movement of the second movable saw;
(m) a shadow line apparatus comprising a first lamp assembly and a second lamp assembly with each lamp assembly having means to cast a shadow line;

(n) a fifth means connecting the first cylinder with the first lamp assembly so as to move said assembly in conjunction with the movement of the first saw; and,
(o) a sixth means connecting the second cylinder with the second lamp assembly so as to move said assembly in conjunction with the movement of the second jaw.

8. A sawmill edger, said edger comprising:
(a) a main shaft;
(b) a plurality of movable saws on said main shaft;
(c) a combination of a first and a second fluid actuated cylinder;
(d) each of said cylinders having a movable plunger with the first cylinder being connected to the second cylinder;
(e) a first means connecting the plunger of the first fluid actuated cylinder and a first movable saw of said plurality of movable saws;
(f) a second means connecting the plunger of the second fluid actuated cylinder and a second movable saw of said plurality of movable saws.
(g) a first shaft and a second shaft;
(h) a first sprocket fixed to the first shaft and a second sprocket freely rotatable on the first shaft;
(i) a third sprocket fixed to the second shaft and a fourth sprocket freely rotatable on the second shaft;
(j) a first chain connecting the first and fourth sprockets;
(k) a second chain connecting the second and third sprockets;
(l) a third means connecting the plunger of the first fluid actuated cylinder to the first chain;
(m) a fourth means connecting the plunger of the second fluid actuated cylinder to the second chain;
(n) a fifth sprocket fixed to the first shaft;
(o) a sixth sprocket fixed to the second shaft;
(p) a shadow line apparatus comprising a first lamp assembly and a second lamp assembly with each lamp assembly having means to cast a shadow line, and a third shaft and a fourth shaft;
(q) a seventh sprocket fixed to the third shaft;
(r) an eighth sprocket fixed to the fourth shaft;
(s) a third chain connecting the fifth and the seventh sprockets;
(t) a fourth chain connecting the sixth and the eighth sprockets;
(u) a ninth sprocket fixed to the third shaft and a tenth sprocket freely rotatable on the third shaft;
(v) an eleventh sprocket fixed to the fourth shaft and a twelfth sprocket freely rotatable on the fourth shaft;
(w) a fifth chain connecting the ninth sprocket and the twelfth sprocket;
(x) a sixth chain connecting the tenth sprocket and the eleventh sprocket;
(y) said first lamp assembly connecting with the fifth chain so as to move in response to the movement of the plunger of the first fluid actuated cylinder;
(z) said second lamp assembly connecting with the sixth chain so as to move in response to the movement of the plunger of the second fluid actuated cylinder;
(aa) a thirteenth sprocket freely rotatable on the first shaft, and the fourteenth and fifteenth sprockets fixed to the first shaft;
(bb) a sixteenth sprocket fixed to the second shaft, and seventeenth and eighteenth sprockets freely rotatable on the second shaft;
(cc) a seventh chain connecting the thirteenth and the sixteenth sprockets;
(dd) an eighth chain connecting the fourteenth and the seventeenth sprockets;
(ee) a ninth chain connecting the fifteenth and the eighteenth sprockets;
(ff) a discharge assembly for removing lumber from the vicinity of the saws;
(gg) a support in said discharge assembly;
(hh) said discharge assembly comprising a first belt assembly and a second belt assembly;
(ii) said belt assemblies comprising a frame, two spaced-apart wheels and a belt running around said wheels;
(jj) said belt assembly capable of moving on said support;
(kk) a first belt assembly having a stud shaft, a sprocket on said stud shaft, and said sprocket co-fitting with said ninth chain; and,
(ll) a second belt assembly having a stud shaft, a first sprocket and a second sprocket on said stud shaft, and said first sprocket co-fitting with the seventh chain and said second sprocket co-fitting with the eighth chain.

9. A sawmill edger, said edger comprising:
(a) a main shaft;
(b) a plurality of movable saws on said main shaft;
(c) a combination of first and second fluid-actuated cylinders;
(d) each of said cylinders comprising a main cylinder wall;
(e) a common dividing partition inside of the main cylinder wall;
(f) a first plunger extending in one direction out of the main cylinder wall and a second plunger extending out of the other direction of the main cylinder wall;
(g) said first and second plungers being on opposite sides of said partition;
(h) a first movable cylindrical member in the main cylinder wall and a second movable cylindrical member in the main cylinder wall;
(i) said first movable cylindrical member being on one side of the partition wall and said second movable cylindrical member being on the other side of the partition wall;
(j) said first plunger being in the first cylindrical movable member and said second plunger being in the second cylindrical movable member;
(k) and the first plunger of the first fluid-actuated cylinder being connected to the second plunger of the second fluid-actuated cylinder;
(l) a first means connecting the first plunger of the first fluid-actuated cylinder and a first movable saw of said plurality of movable saws;
(m) a second means connecting the first plunger of the second fluid-actuated cylinder and a second movable saw of said plurality of movable saws;
(n) a first shaft and a second shaft;
(i) a first sprocket fixed to the first shaft and a second sprocket freely rotatable on the first shaft;
(p) a third sprocket fixed to the second shaft and a fourth sprocket freely rotatable on the second shaft;
(q) a first chain connecting the first and fourth sprockets;
(r) a second chain connecting the second and third sprockets;
(s) a third means connecting the first plunger of the first fluid-actuated cylinder to the first chain;
(t) a fourth means connecting the first plunger of the second fluid-actuated cylinder to the second chain;
(u) a fifth sprocket fixed to the first shaft;
(v) a sixth sprocket fixed to the second shaft;
(w) a shadow line apparatus comprising a first lamp assembly and a second lamp assembly with each lamp assembly having means to cast a shadow line, and a third shaft and a fourth shaft;
(x) a seventh sprocket fixed to the third shaft;
(y) an eighth sprocket fixed to the fourth shaft;
(z) a third chain connecting the fifth and the seventh sprockets;
(aa) a fourth chain connecting the sixth and the eighth sprockets;

(bb) a ninth sprocket fixed to the third shaft and a tenth sprocket freely rotatable on the third shaft;
(cc) an eleventh sprocket fixed to the fourth shaft and a twelfth sprocket freely rotatable on the fourth shaft;
(dd) a fifth chain connecting the ninth sprocket and the twelfth sprocket;
(ee) a sixth chain connecting the tenth sprocket and the eleventh sprocket;
(ff) said first lamp assembly connecting with the fifth chain so as to move in response to the movement of the first saw;
(gg) said second lamp assembly connecting with the sixth chain so as to move in response to the movement of the second saw;
(hh) a thirteenth sprocket freely rotatable on the first shaft, and fourteenth and fifteenth sprockets fixed to the first shaft;
(ii) a sixteenth sprocket fixed to the second shaft, and seventeenth and eighteenth sprockets freely rotatable on the second shaft;
(jj) a seventh chain connecting the thirteenth and sixteenth sprockets;
(kk) an eighth chain connecting the fourteenth and seventeenth sprockets;
(ll) a ninth chain connecting the fifteenth and eighteenth sprockets;
(mm) a discharge assembly for removing lumber from the vicinity of the saws;
(nn) a support in said discharge assembly;
(oo) said discharge assembly comprising a first belt assembly and a second belt assembly;
(pp) said belt assemblies comprising a frame, two spaced-apart wheels and a belt running around said wheels;
(qq) said belt assembly capable of moving on said support;
(rr) a first belt assembly having a stud shaft, a sprocket on said stud shaft, and said sprocket co-fitting with said ninth chain so as to move in response to the movement of the first saw; and,
(ss) a second belt assembly having a stud shaft, a first sprocket and a second sprocket on said stud shaft, and said first sprocket co-fitting with the seventh chain and said second sprocket co-fitting with the eighth chain so as to move in response to the movement of the second saw.

References Cited by the Examiner

UNITED STATES PATENTS

| | | | |
|---|---|---|---|
| 369,026 | 8/1887 | Parish | 143—37.1 |
| 899,297 | 9/1908 | Erickson | 91—173 |
| 1,761,096 | 6/1930 | Tower | 143—37.1 |
| 1,786,925 | 12/1930 | Wiegelmann | 143—168.5 |
| 2,501,299 | 3/1950 | Anderson | 143—37.1 |
| 2,510,471 | 6/1950 | Horstkotte | 143—168.5 |
| 2,595,879 | 5/1952 | Pasquier | 143—37.1 |
| 3,004,390 | 10/1961 | Duffy | 91—173 |
| 3,017,909 | 1/1962 | Bowling et al. | 143—157.4 |
| 3,045,726 | 7/1962 | Grogan | 143—37 |
| 3,101,755 | 8/1963 | Stupfel et al. | 143—168.5 |

FOREIGN PATENTS 567,994  12/1958  Canada.

HAROLD D. WHITEHEAD, *Primary Examiner.*

WILLIAM W. DYER, Jr., LESTER M. SWINGLE, ROBERT C. RIORDON, *Examiners.*